April 30, 1946.                D. COLLINS                2,399,542
                THROTTLE AND STARTER CONTROL MECHANISM
                    Filed Dec. 8, 1930        3 Sheets-Sheet 3
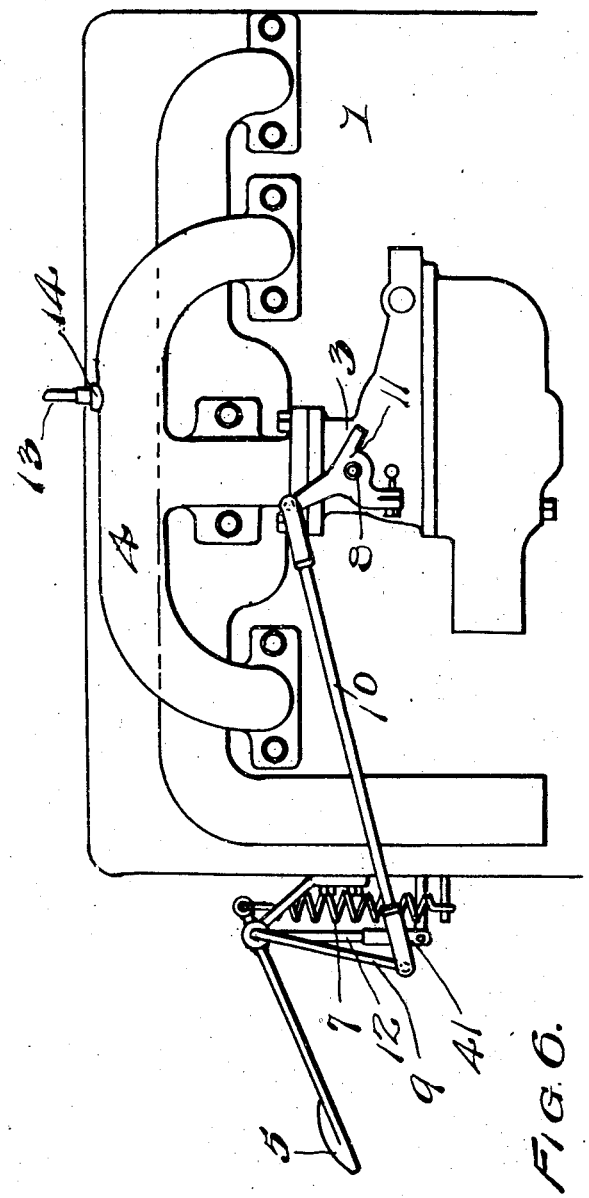
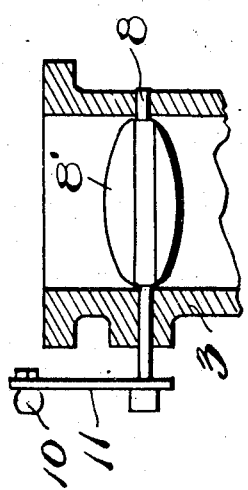
Inventor
DOUGLAS COLLINS
By Chas K. Davis
                    Attorney Patented Apr. 30, 1946

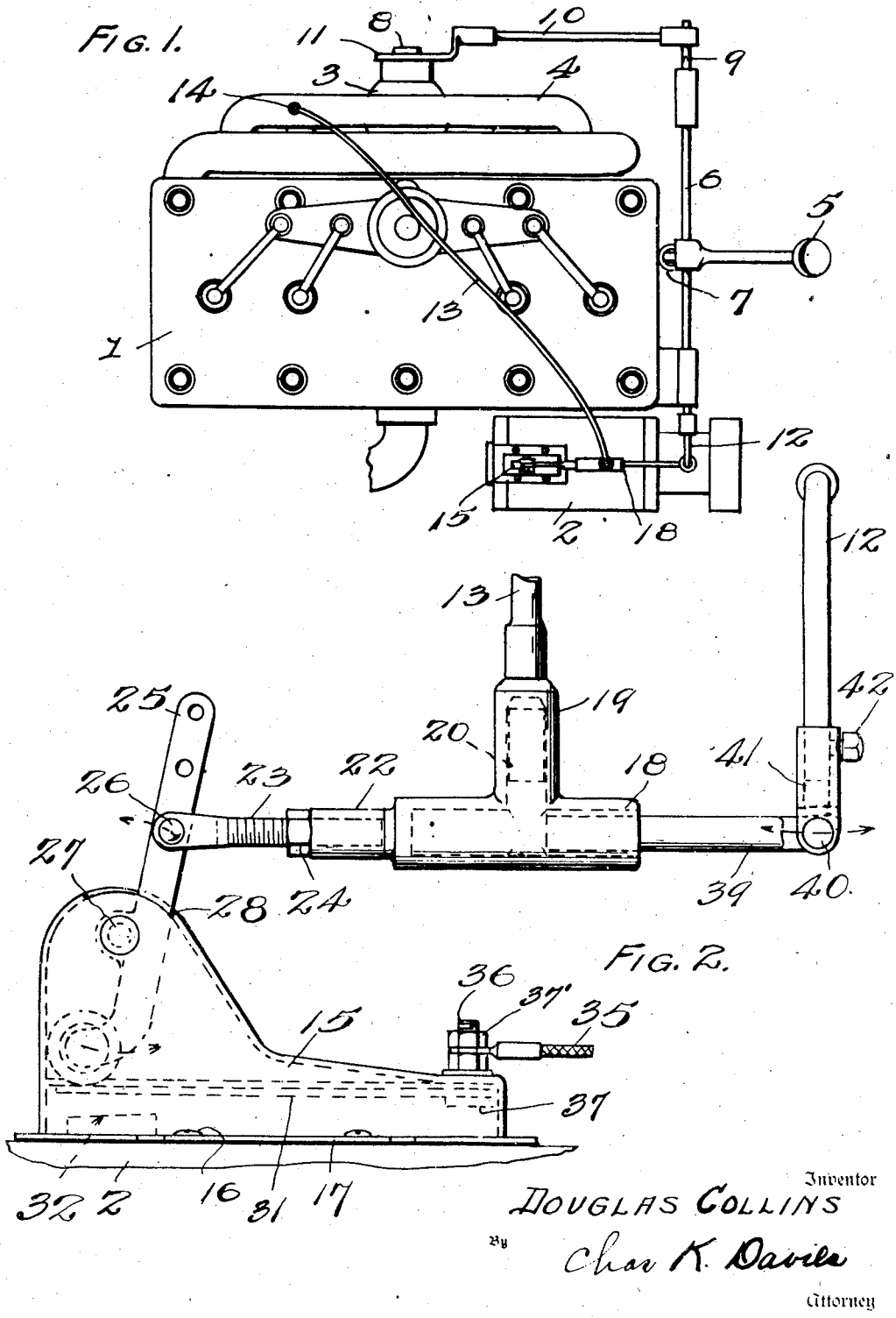

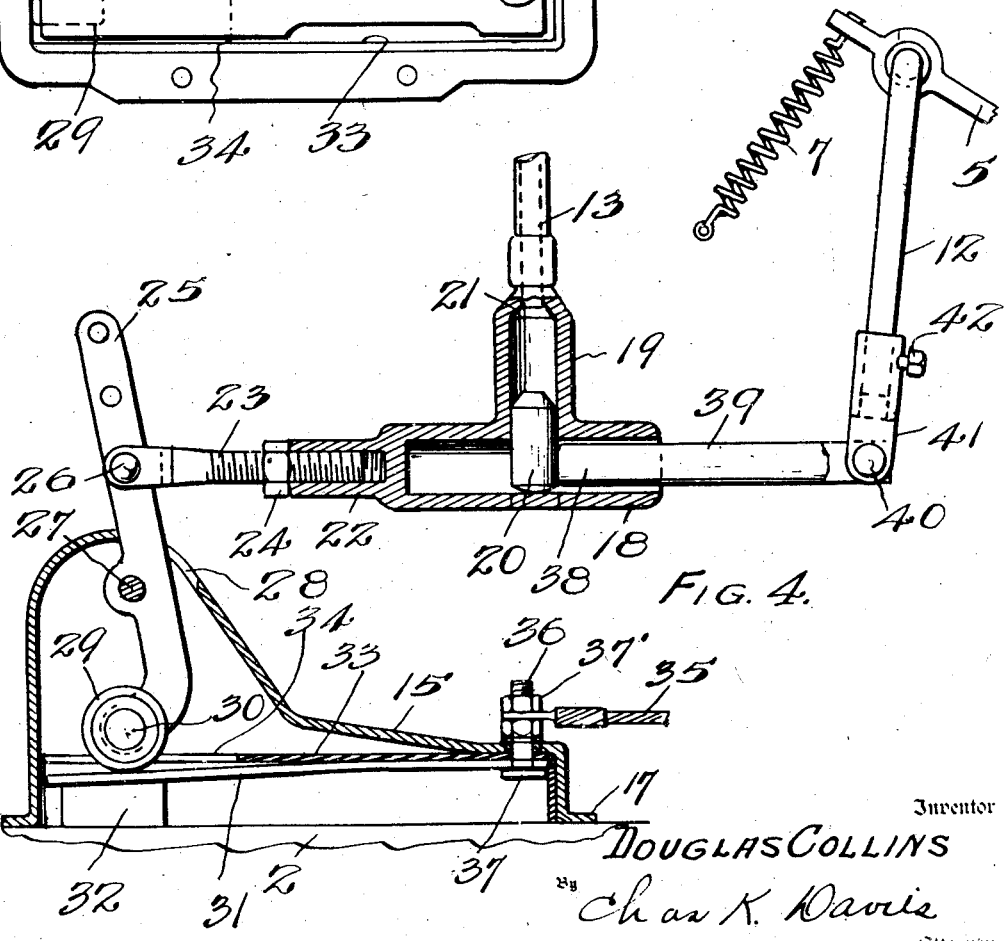

2,399,542

UNITED STATES PATENT OFFICE 2,399,542

THROTTLE AND STARTER CONTROL MECHANISM

Douglas Collins, Salisbury, N. C.

Application December 8, 1930, Serial No. 500,947

51 Claims. (Cl. 123—179)

This invention relates to apparatus for controlling the operation of internal combustion engines and more particular to apparatus for controlling the operation of the starting devices for such engines.

It is an object of the present invention to provide means for controlling the operation of the engine starting apparatus in response to the operation of certain control devices which must be operated by the operator of the engine or in the case of an engine for an automotive vehicle, by the driver of the vehicle to control the operation of said engine or vehicle under ordinary operating conditions. In other words, it is an object of the invention to provide a control device for the starting apparatus which is so constructed that the operation of some specific control member to render the starting apparatus effective, is eliminated, both when it is desired to start the engine initially and to restart the engine in the event of accidental stopping thereof.

More specifically stated, it is an object of the invention to control the engine starting apparatus in response to the operation of some mechanical device associated with the engine of the vehicle such for instance, as the accelerator pedal, which controls the quantity of mixture supplied to the engine.

In conjunction with this control device, it is a further object of the invention to provide means for preventing the operation of the engine starting apparatus while the engine is running under its own power.

According to this invention, these objects are attained by the provision of a starting motor, the circuit of which is controlled by a switch operated by the accelerator pedal so that operation of the accelerator pedal to control the quantity of mixture supplied to the engine will close the switch in the starting motor circuit whenever the engine is stopped in order to cause the starting of the engine if the ignition switch is in closed position when the operation of the accelerator pedal takes place, in combination with means operated by engine suction to prevent any possible actuation of the starting motor while the engine is running under its own power.

Further objects and advantages of the present invention will be apparent from the following description, reference being had to the accompanying drawings, wherein a preferred embodiment of one form of the present invention is clearly shown.

In the drawings:

Figure 1 is a top plan view showing a conventional motor, or as much thereof as is necessary to illustrate the installation therewith of the starting mechanism of my invention.

Figure 2 is an enlarged view in elevation showing the operating parts of my invention in the positions occupied when the motor or engine is running.

Figure 3 is a top plan view of the parts in Figure 2.

Figure 4 is a side view partly in section with the parts in the position for starting the engine.

Figure 5 is a view at the underside of the housing which is attached to the starter, showing the resilient switch blade of the starter circuit.

In order that the general arrangement and installation of my invention may readily be understood, I have indicated in Figure 1 a top plan of a conventional internal combustion engine 1, as used for propelling automobiles, boats, or for other purposes, and various accessories of the engine are designated as the starter-motor 2 for cranking the engine, the carburetor 3 as a whole, and the intake manifold 4 between the engine and the carburetor.

The usual pedal 5 (or accelerator foot-lever), when the engine is used as motive power for an automobile, is located in the usual position where it is readily accessible to the driver of the automobile and is fixed on the rock shaft 6, which extends disposed transversely of the vehicle at the rear of the engine, and is usually journaled in bearings in front of the inclined foot boards, between the floor and the cowl of the automobile. A conventional spring 7 is indicated in connection with the pedal or rock shaft, and the pedal is depressed against the tension of this spring to open the throttle which controls the supply of fuel mixture to the combustion chambers. The spring returns the rock shaft and pedal to normal position to close the throttle when the pedal is released. The usual manually operated throttle mechanism, controlled by hand from the steering wheel of the automobile, is also connected with the foot-operated throttle mechanism here illustrated, but this manually operated throttle mechanism is omitted from the drawings, for convenience of illustration.

I utilize the rock shaft 6 to operate the starting mechanism of my invention, and motion is transmitted from this transversely extending rock shaft, in the usual manner, to the throttle shaft 8 and throttle 8' through the medium of a downwardly extending crank arm 9 at one end of the shaft 6, link 10, and a lever 11 of fan-shape, the latter rigid with the throttle shaft. At the other end of the rock shaft 6 another downwardly extending angular crank arm 12 is rigidly fixed to rock with the shaft 6, and the crank arm 12 is employed to operate mechanism hereinafter described, which controls the operation of the starting motor.

Thus, with this particular type of automobile engine, the throttle mechanism is actuated at one side of the engine, and the mechanism for controlling the starting motor is located at the opposite side of the engine where said starting motor 2 is located.

In connection with the mechanism for controlling the starting motor, I employ a flexible tube 13 of suitable construction which at one end is attached at 14 to the intake manifold, and I utilize suction from the cylinders of the engine for automatic operation of the control device to render said mechanism ineffective after the engine is started, as will hereinafter be described.

Because of the various arrangements and locations for the carburetor, intake manifold, and starter, employed on different automobile engines, the parts of my invention may be located and supported on various accessories of the engine, but as one exemplification of the equipment for an engine I have shown a simple supporting housing 15 that is secured by screws 16 passing through flanges 17 of the housing and into the wall of the casing of the starting motor.

The control device for operating the switch of the starting motor includes a small cylinder 18, disposed longitudinally of the engine and motor, and provided with an upright cylindrical valve casing 19, to the upper end of which casing the flexible suction tube or hose 13 from the intake manifold is secured in suitable manner.

The cylinder 18 and the valve casing 19 which is integral therewith is reciprocable longitudinally of the engine and is moved toward the left in Fig. 2, by means more fully described later, to close the switch which controls the starting motor 2, so as to cause the starting motor to start the engine. When the engine becomes self-operative, the cylinder 18 is returned to its original position and remains in that position as long as the engine continues to operate.

For rendering the control device operative to close the switch of the starting motor to crank the engine, and for rendering the control device inoperative after the engine is running, I provide a valve plug 20 which falls by gravity into a seat located transversely of the cylinder 18, as in Figure 4, but which is lifted to engage the valve seat 21 at the upper end of the valve casing 19, and the valve is held in such position by suction, while the engine is running, as indicated by the dotted lines, Figure 2.

While the engine is running, the suction of the cylinders is communicated through the flexible hose 13 to the upper part of the valve chamber 19, and atmospheric pressure below the plug holds it to its seat 21, clear of the cylinder 18.

When the valve-plug is in the position of Figure 4, it forms an abutment for a purpose as will be described, but in the position of Figure 2, the abutment is removed and the valve engages seat 21.

At its forward or closed end, the cylinder 18 is provided with a tubular, threaded, socket or boss 22 which receives an alined threaded bolt 23, and a lock nut 24 on the bolt is used to lock the bolt in any adjusted position in the boss.

The bolt is rigid with the cylinder and its outer end, which may be forked as shown, is pivotally connected with a switch operating lever 25 by a pin 26 which may be engaged in any one of the holes in the lever so as to vary the movement of said lever. The switch lever 25 is pivoted at 27 on a pin or bolt that extends transversely through the spaced side walls of the housing 15, the upper wall of the housing being slotted at 28 to permit the required movement of the lever. As shown in the drawings, the lever 25 extends through the slot 28 in the housing, the slot being wide enough to permit free movement of the lever and may act as a guide for the lever. As shown, the slot is of such length that when the lever reaches the left end of the slot, the switch is closed, as indicated in Fig. 4, and when the lever reaches the right end of the slot the roller 29 is in engagement with the housing, as shown in Fig. 2. The exact dimensions of the slot are not material, but it must be long enough to permit proper opening and closing of the switch.

The switch lever is preferably of angular shape with its upper arm projecting above the housing and its lower arm enclosed within the housing. At the end of the arm within the housing the lever 25 carries one or more rollers 29 of insulating material, journaled at 30, and located just above a resilient, or spring blade 31 that forms the movable member of the starting motor switch.

The movable contact maker, of suitable material, is designed to be forced by the rollers into contact with the stationary contact member 32 of the switch, the stationary member being mounted on the exterior of the starting motor within the housing and is electrically connected with the motor in any suitable manner. Within the housing a lining 33 of insulating material is provided as a shield for the blade 31 to prevent contact therewith against the housing, and the lining is cut away as at 34 to accommodate the rollers which bear upon the blade.

A wire 35 of the starting motor circuit is indicated as connected with the terminal bolt 36, and the latter is passed upwardly through holes in the blade and in the housing, a head 37 on the lower end of the bolt being used to secure the end of the blade, the bolt and blade being properly insulated from the housing. The usual nuts 37' are provided for securing the bolt and locking the terminal on the post, and as shown in dotted lines in Figure 2, the tension of the spring blade holds the lever 25 in angular position with the rollers contacting with the front wall of the housing.

Within the cylinder 18 a cylindrical plunger head 38 is adapted to reciprocate, and to engage the pin 20 when the latter is in its lowered position, as shown in Fig. 4 in order to move the cylinder to close the switch, as more fully described later. This head is an integral part of the rod 39 that projects through the open end of the cylinder. At 40 this rod is pivoted to an adjustable socket head 41 on the lower, free end of the crank arm 12, and the socket head is fixed in adjusted position by means of a set bolt 42.

By means of the adjustable connections including the bolt 23, socket boss 22, lock nut 24 and the socket head 41 on the crank arm 12, the length of the operating connection between the switch lever 25 and the crank arm 12, as well as the effective length of the crank arm, may be adjusted to secure the desired movement of the switch lever for any given movement of the operating pedal. Also it will be obvious that by variations in these same adjustable connections, the position of the throttle, when the switch is closed, may be varied to some extent. The movement of the switch lever 25, for any given movement of the operating pedal 5, may also be varied by changing the point of connection of the element 23 with the switch lever 25. Three different holes for connecting the element 23 with said lever 25 are shown in the drawings.

The performance required of the driver in starting the engine, or the vehicle equipped with the starting mechanism of my invention is quite simple. After the ignition switch is closed, the pedal 5 is depressed to open the throttle between the carburetor and the intake manifold to admit fuel mixture to the cylinders, and the rocking or rotary movement of the rock shaft 6 is converted to longitudinal movement of the rod 39 and its head 38. The head 38 is thus pushed against the plug valve or abutment pin 20, which is at rest in the cylinder 18 in the path of movement of the head 38, and the rod and cylinder are thus brought into rigid relation to one another. After contacting with the abutment, the continued movement of the rod and its head push the abutment and cylinder to the left or toward the front of the engine, causing the lever 25 to swing on its pivot 27 into the position of Figure 4 where the rollers on the lever have depressed the movable contact blade 31 into contact with the stationary member 32. The circuit for the starting motor is thus closed and the motor is energized to crank the engine the cylinders of which have been, or are supplied with fuel mixture when the throttle is opened by depression of the pedal 5.

When the engine has started, the suction is communicated through the intake manifold and hose 13 to the lowered valve plug or abutment pin 20, and the latter is elevated, by atmospheric pressure in the cylinder 18, from the position of Figure 4 to the dotted position of Figure 2, and as long as the engine continues running, the abutment is thus held out of the path of movement of the rod 39 or its head 38.

When the fuel supply is cut off and the engine stops running, the abutment pin 20 is released and drops by gravity to the position of Figure 4, and when the engine is unintentionally stopped, as by "stalling," the same result is accomplished. Thus the abutment drops into position to again co-operate with the rod 39 for closing the starter switch when the pedal 5 is operated to open the throttle, whenever the engine stops unless the pedal 5 was in such a position at the time that the rod 39 was underneath the pin 20. Stopping with the parts in such position would only take place in the event of stalling under heavy load with an open throttle. Such an event is infrequent and, of course, as soon as the pedal 5 is allowed to return to normal by the operator the pin 20 is permitted to drop to the position shown in Fig. 4, when it is effective to establish an operating connection between the accelerator pedal and the switch lever 25.

In automotive vehicles of the conventional design the accelerator pedal and hand throttle are so arranged that operation of the hand throttle also operates the accelerator pedal, but operation of the latter does not operate the hand throttle. With a construction of this character the mechanism for operating the starter switch, which is disclosed herein would be operated if either the hand throttle or the pedal 5 were operated so as to concurrently close the starter circuit and open the throttle to a position to supply the desired amount of fuel mixture to the engine.

During operation of the engine under very heavy loads and with wide open throttle the engine suction might be insufficient to hold the pin 20 in its upper position so that the pin might tend to drop into the position shown in Figure 4 and permit the starting motor to be rendered effective when the engine was not actually stopped. However, under such operating conditions, the throttle is wide open and in such position of the throttle the rod 39 is moved to the left in Figure 4 so far that it lies below the pin 20 and prevents the valve from moving to a position where it could be operated by said rod. Under all operating conditions when the rod occupies a position to the right of the pin 20 in Figure 3, the suction of the engine is always sufficient to hold the pin in its upper position, so that at no time when the engine is running under its own power, is there any possibility of effecting operation of the starting motor.

Not only with the device disclosed herein is it impossible to close the starter switch by actuation of the accelerator pedal when the engine is self-operative, it is also impossible to close the switch if the accelerator pedal is depressed when the engine is not operating under its own power, but is being driven by the vehicle as is sometimes the practice when the engine is being used as a brake while the vehicle is going down hill. Ordinarily under such conditions the accelerator pedal is not depressed and the throttle is closed under which conditions the suction is sufficient to hold the pin 20 in its upper or ineffective position. If, however, the accelerator pedal be accidentally depressed, or depressed intentionally to open the throttle so as to admit air to the cylinders for the purpose of eliminating the effect of flooding, or for any other purpose, the end of the rod 39 is moved to a position beneath the pin 20 before suction falls enough to permit pin 20 to drop to a position where it would be engaged by said rod. Therefore, the pin 20 cannot be engaged by rod 39 and the switch cannot be closed by depression of the accelerator pedal unless the engine is stopped.

A device of the character shown and claimed herein is particularly desirable for the reason that it eliminates one manual operation necessary where a pedal or button controls the starting motor only. It is particularly advantageous in a vehicle equipped with free wheeling. During free wheeling operation, the engine is likely to stall without knowledge of the driver, which might lead to serious accident and is always an inconvenience in requiring the engine to be started by manual operation of the starter pedal. With the devices disclosed herein, the operator of the vehicle moves the accelerator pedal to resume normal operation at the end of any free wheeling period and if the engine has stopped during free wheeling operation, it is automatically started without additional attention by the operator of the vehicle. Also by controlling the starter from the accelerator pedal, the proper functioning of the throttle and the operation of the starting motor is effected by actuation of one single element, a very desirable simplification and improvement.

It will be understood that the pressure exerted by the operator on the pedal 5, to hold the starter switch closed, causes the pin 20 to be held between the end of the rod 39 and the wall of housing 19 with sufficient force to prevent the movement of the pin by engine suction until the pressure on pedal 5 is reduced to such an extent that the frictional resistance to upward movement of the pin is less than the force exerted by engine suction to lift the pin, which obviously is not very great in the specific device disclosed in the drawings because of the relatively small size of the pin.

In actual use the switch is held closed by the operator with a reasonably heavy pressure and when the engine starts to run, the operator probably instinctively and without deliberate conscious effort ceases to press hard on the pedal immediately so that the pin apparently snaps upwardly to break the operating connection between pedal 5 and the switch lever without any action on the part of the operator. It is true that it is not necessary for the parts to be restored to normal position before the suction is effective to move pin 28, as this movement takes place just as soon as the pressure on the pin becomes less than the force of the suction. This may take place with a relatively slight movement of the parts and the movement required will depend on the strength of the switch spring and other factors, but it will be apparent that this relief of pressure on the pin must take place before suction can move the pin, and the switch will remain closed until the operator reduces the pressure of his foot, as described in the device as shown.

It will also be apparent that it may be necessary to vary the adjustment of the operating parts for different engines in order to secure proper performance and to insure that the throttle be in the proper position to supply the most desirable quantity of fuel mixture for starting that particular engine when the switch is closed to cause the engine to be cranked by the starting motor.

While the embodiment of the invention herein disclosed, constitutes a preferred form, it is to be understood that other forms might be adopted, all coming within the scope of the claims which follow.

What is claimed is as follows:

1. In a starting mechanism for internal combustion engines having a starting motor, a switch therefor and mechanism for variably controlling the supply of fuel to said engine, of means for operatively connecting said fuel supply mechanism and switch when the engine is stopped whereby the said switch is closed when said control mechanism is operated to supply fuel to the engine, and means for automatically preventing closing of the switch after the engine is started.

2. In a starting mechanism for internal combustion engines, the combination with the fuel control mechanism and a starter control switch, of means for operatively connecting said mechanism and switch whereby the latter is automatically closed when fuel is fed to the engine, and means operative under suction from the engine for disconnecting said fuel control mechanism from the switch so that the switch will not be closed by the fuel control mechanism during engine operation.

3. In a starting mechanism for internal combustion engines, the combination with a fuel mixture control mechanism, a starting motor and a control switch for controlling the operation of the starting motor, of means for operatively connecting the fuel mixture control mechanism and said switch whereby the latter is closed when fuel mixture is supplied to the engine, and means whereby the engine, when in operation, disconnects said mixture control mechanism and switch, so as to permit operation of the mixture control mechanism during engine operation without closing said switch.

4. In a starting mechanism for internal combustion engines having an intake passage provided with a throttle valve for controlling the mixture supply and a starting motor; the combination of a pedal operated mechanism for operating the throttle valve, a starter control switch for the starting motor, means operatively connecting said pedal operated mechanism and switch when the engine is stopped, whereby the latter is closed when the throttle is opened, means for disconnecting the mechanism and switch after the engine is running, whereby the switch is maintained in open position during operation of the engine.

5. In a starting mechanism for internal combustion engines having an intake passage provided with a throttle valve for controlling the mixture supply and a starting motor; the combination of a pedal operated mechanism for operating the throttle valve, a starter control switch for the starting motor, means operatively connecting said pedal operated mechanism and switch when the engine is stopped, whereby the latter is closed when the throttle valve is opened, means operated by suction from the engine for disconnecting the mechanism and switch when the engine is running, whereby the switch is maintained in open position during operation of the engine.

6. In a starting mechanism for internal combustion engines having an intake passage provided with a throttle valve for controlling the mixture supply and a starting mechanism; the combination of a mechanism for operating the mixture throttle valve and starting mechanism for starting the engine, of means for operatively connecting said mechanisms whereby the starting mechanism is caused to become operative when the throttle operating mechanism is operated, means operated by engine suction for disconnecting said throttle operating mechanism from the starting mechanism whereby said throttle operating mechanism is rendered inoperative to cause operation of the starting mechanism when the engine is running.

7. In a starting mechanism for internal combustion engines having a throttle control mechanism for regulating the mixture supply, a starting motor, and a control switch therefor; the combination of means for operatively connecting said mechanism and switch comprising a push-rod actuated by said mechanism, a relatively movable guide in which the push-rod may reciprocate, an abutment in the guide in the path of movement of the push-rod, means operated by the guide for closing the switch, means operated under suction from the engine for removing the abutment from the path of the push-rod, and means for automatically opening the switch.

8. Control apparatus for internal combustion engines comprising a current source, a starting motor adapted to be operated by current from said source, means for controlling the quantity of combustible mixture supplied to said engine, means operated by said mixture controlling means for rendering the starting motor effective to start the engine, and means operated by the engine for preventing the operation of said last named means by its operating means when the engine is in operation.

9. Control apparatus for internal combustion engines comprising a current source, a starting motor adapted to be operated by current from said source, means for controlling the quantity of combustible mixture supplied to said engine, means operated by said mixture controlling means for rendering the starting motor effective, and means operable by the engine when running at speeds above a predetermined speed to cause the means for rendering the starting motor effective to be inoperative by its operating means.

10. Control apparatus for internal combustion engines comprising a current source, a starting motor adapted to be operated by current from said source, means for controlling the quantity of combustible mixture supplied to said engine, motor control means operable by said mixture controlling means for rendering said starting motor operative, a member operable in accordance with some variable function of the engine and adapted to occupy different positions when the engine is operative and inoperative and means operable by said member to prevent operation of the motor control means by its operating means.

11. The combination of an automotive propelling engine, a throttle device in control of the fuel supply thereto, an electric starting motor and a control switch for controlling the operation thereof, an accelerator pedal accessible to the driver for operating said device and controlling the operation of the control switch, a member occupying one position when the engine is at rest and movable by the engine to another position, said member being effective when so moved to prevent operation of the control switch by the accelerator pedal.

12. In combination with an automotive propelling engine having an intake pipe for supplying fuel mixture to said engine and a throttle device therefor to control the amount of fuel mixture supplied to the engine; an electric starting motor and a control switch therefor, an accelerator pedal accessible to the driver for operating said throttle deivce and for operating said switch to cause operation of the starting motor, a member responsive to engine suction and adapted to occupy different positions when the engine is active or inactive, and means controlled by the position of said member when the engine is running under its own power for preventing operation of the switch by the accelerator pedal 13. In combination with an automotive propelling engine having an intake pipe for supplying fuel mixture to said engine and a throttle device therefor to control the amount of fuel mixture supplied to the engine; an electric starting motor and a control switch therefor, an accelerator pedal accessible to the driver for operating said throttle device, an operating connection between the accelerator pedal and the control switch, a member occupying one position when the engine is inactive and movable by the engine suction to another position when the engine is self-operative to disable said operating connection, and means effective when the accelerator pedal is operated during operation of the engine to move the throttle to relatively wide open position to maintain said member in the position which it occupies when the operating connection is disabled.

14. In an automobile, the combination of a propelling engine, a fuel mixture throttle operable to vary the engine speed at will, an electric starting motor, an accelerator pedal accessible to the driver and having connections for opening said throttle, means, including a starting motor switch, operable from said pedal to start said motor coincidentally with the opening of the throttle, and an engine-operated device controlling said means and rendering the same inactive when the engine is running.

15. In an automobile, the combination of an engine, a throttle in control of the fuel supply thereto, an accelerator pedal accessible to the driver and having a stroke adequate to move said throttle throughout its range of movement, a starting motor, means, including a switch, operable by said pedal during the early part of its stroke to start said motor, and an engine-operated device controlling said means, rendering the same inactive when the engine is running.

16. In an automobile, the combination of an engine, a carburetor, a suction-intake therefrom to the engine, a throttle in said intake, an accelerator pedal accessible to the driver and available to operate said throttle to vary the engine speed, an electric starting motor, means including a switch operable by said pedal to control the starting of said motor, a suction-responsive device controlling said means and a suction tube connecting with the intake at a point posterior to the throttle and communicating engine suction to said device.

17. The combination with an internal combustion engine having a fuel control mechanism, a starting motor, a switch, and circuit therefor, of a control element for the switch operatively connected with the fuel control mechanism, and means under control of suction from the engine for rendering the control element inoperative by the fuel control mechanism to close the starting motor circuit when the engine is running.

18. In combination with an internal combustion engine having a fuel control mechanism, a starting motor, switch, and circuit therefor; a control lever for the switch pivotally connected with the fuel control mechanism, and means under control of suction from the engine for rendering the control lever inoperative by the fuel control mechanism when the engine is running.

19. In a starting apparatus for internal combustion engines having a starting motor, an intake pipe, a throttle therein and operating mechanism for said throttle; a switch for controlling the operation of said starting motor, means operable by said throttle operating mechanism for closing said switch, means operated by the engine when running for rendering the throttle operating mechanism inoperative to close the switch, whereby the switch is prevented from being closed by the throttle operating mechanism during operation of the engine under its own power.

20. Control apparatus for internal combustion engines comprising a current source, a starting motor operable by current from said source, means for variably controlling the quantity of combustible mixture supplied to the engine during the normal operation thereof, means operated by the mixture controlling means for causing the starting motor to become operative to start the engine and means operable in response to operation of the engine under its own power for preventing the starting of the engine in response to actuation of the mixture controlling means.

21. In an automobile, the combination of a propelling engine, a throttle operable to vary the engine speed at will, an electric starting motor having a circuit and a starting switch therein, an accelerator pedal accessible to the driver and having permanent connections to said throttle, switch actuating means including a member movable into and out of position to be also operated by said pedal, said member being controlled by a variable function of the engine and adapted to occupy the first position when the engine is at rest and the other position when the engine is active.

22. The combination of an automotive propelling engine, a throttle device in control of the fuel supply thereto, an electric starting motor with a starting switch in the circuit thereof, an accelerator pedal accessible to the driver and mechanical connections therefrom to the throttle device, a member correlated to some variable function of the engine to hold different positions according as the engine is active or inactive, an operating connection between the accelerator pedal and said switch that is rendered effective when said member is in one of its positions and is disabled when said member is moved to another position, said operating connection being so constructed that the switch is closed after a predetermined opening movement of the throttle, and means whereby this predetermined opening of the throttle may be varied.

23. Control apparatus for internal combustion engines comprising a current source, a starting motor operable by current from said source, means for controlling the operation of the starting motor, means for controlling the supply of combustible mixture to the engine, operating connections between the last mentioned means and the means for controlling operation of the starting motor, and means operable in response to operation of the engine under its own power, and effective to disable said operating connections, so that the mixture controlling means may be operated during engine operation without having any effect on the starting motor.

24. In a starting mechanism for internal combustion engines having a starting motor, a switch therefor and mechainsm for variably controlling the supply of fuel to said engine, the combination of means for operatively connecting said fuel supply mechanism and the starter switch when the engine is stopped whereby the said switch is automatically closed when said controlling mechanism is operated to supply fuel to the engine, said connecting means being adjustable so as to limit the movement of the fuel controlling mechanism when it is operated to increase the supply of fuel as the starter switch is closed thereby and means operated by the engine for disabling the connecting means between the fuel controlling means and the starter switch when the engine is running.

25. In a starting mechanism for internal combustion engines having a starting motor, a switch therefor and mechanism for variably controlling the supply of fuel to said engine, the combination of means for operatively connecting said fuel supply mechanism and the starter switch when the engine is stopped whereby the said switch is automatically closed when said controlling mechanism is operated to supply fuel to the engine, said connecting means being adjustable so as to limit the movement of the fuel controlling mechanism when it is operated to increase the supply of fuel as the starter switch is closed thereby and means operated by engine suction for disabling the connecting means between the fuel controlling means and the starter switch when the engine is running.

26. In an automotive vehicle, the combination with the foot operated accelerator pedal by which the speed of its engine is controlled, of means to start the engine comprising an electric starting motor, a source of electrical energy, means operable by the depression of the foot accelerator pedal to effect connection of the starting motor with the source of electrical energy, and means actuated by the engine when in operation to render the pedal operated means ineffective to bring about the connection of the starting motor with the source of electrical energy, whereby the depression of the pedal after the functioning of said engine operated means and during operation of the engine has no effect upon the starting motor.

27. In combination with an internal combustion engine, including a fuel intake system, control means therefor including an accelerator pedal, an electrical starting system for said engine including a starting switch, means for closing said starting switch by initial actuation of the accelerator pedal including a pedal operated member having an abutment, a guide member for said abutment member, operative connections between the guide member and the starting switch, a latch slidably arranged in said guide member and normally engageable by said abutment to connect said guide member and abutment member for motion in unison, and means actuated by vacuum in the intake system of the engine for withdrawing said latch and allowing normal operation of the accelerator pedal.

28. In a starting mechanism for internal combustion engines, the combination of a current source, a starting motor adapted to be operated by current from said source, a switch for connecting the starting motor with said current source, means for controlling the quantity of combustible mixture supplied to the engine, means positively operated by said mixture controlling means for closing said switch to cause said starting motor to become operative and means operated by engine suction to render the mixture controlling means ineffective to close said switch when the engine is operating.

29. In a starting mechanism for internal combustion engines, the combination of a current source, a starting motor adapted to be operated by current from said source, a switch for connecting the starting motor with said current source, an accelerator pedal operable to control the quantity of combustible mixture supplied to the engine, means adapted to be operatively connected with the accelerator pedal so as to be movable thereby to close the starting motor switch when the pedal is moved to increase the quantity of combustible mixture supplied to the engine, means operated by engine suction to disable the connection between the accelerator pedal and the switch operating means in order to effect opening of the said switch to render the starting motor inoperative when the engine is running.

30. In a starting mechanism for internal combustion engines, the combination with the fuel control mechanism, electric starting motor, switch and circuit therefor, of means having a controlling function on the switch and operatively connected with the fuel controlling mechanism, and means under control of fluid pressure created by the engine for rendering said means ineffective when the engine is running.

31. In a starting mechanism for internal combustion engines, the combination with the fuel control mechanism, electric starting motor, switch and circuit therefor, of operating means for the switch operatively connected with the fuel controlling mechanism, and means under control of fluid pressure created by the engine for rendering the operating means ineffective to close the starting motor switch when the engine is running.

32. In a starting mechanism for internal combustion engines, the combination with the fuel control mechanism, electric starting motor, switch and circuit therefor, of an operating element for the switch controlled by the fuel controlling mechanism, and means under control of fluid pressure created by the engine for rendering the operating element inoperable to close the starting motor switch when the engine is running.

33. In a starting mechanism for internal combustion engines, the combination with the fuel control mechanism, electric starting motor, switch and circuit therefor, of operating means for the switch operatively connected with the fuel controlling mechanism, and means under control of the engine for rendering the operating means ineffective to close the starting motor switch when the engine is running.

34. Starting mechanism for internal combustion engines comprising an electric starting motor, an electric circuit therefor, a switch in said circuit, an accelerator for controlling fuel to the engine, an operating member for the switch controlled by said accelerator, and means operated through suction created by the engine for rendering said operating member ineffective to close the switch when the engine is running.

35. In combination with the accelerating control member of an automobile engine, abutment means for limiting the operation of the control member to a fractional portion of its full operating range, said abutment means including a starting switch, and means responsive to the operation of the engine of the automobile for disabling the abutment means.

36. In combination with the fuel feed control member of an internal combustion engine, an operating pedal, abutment means for limiting the initial movement of the pedal to a position which prevents racing of the engine, said abutment means including a starter switch, a connection between said pedal and said starter switch comprising normally registering members, and means responsive to the operation of the engine under its own power for severing said connection by moving said members out of register, said means comprising a fluid pressure motor having a plunger connected to one of said members.

37. In a starting apparatus for an internal combustion engine having a mixture intake pipe, a throttle therein normally positioned to supply sufficient fuel mixture for idling and an accelerator pedal for operating the throttle, the combination of a current source, a starting motor operable by current from said source, a circuit including a control switch for controlling the action of the starting motor, an operating connection between said accelerator pedal and said control switch whereby the switch is closed as said pedal is moved to supply a greater quantity of fuel mixture than is necessary for idling and engine operated means to disable said operating connection prior to return of the throttle to its normal idling position.

38. In an engine control apparatus of the character described, a current source, a starting motor operable by current from said source and in circuit therewith, a control switch for said circuit, means for controlling the supply of combustible mixture to the engine, operating connections extending from said mixture controlling means to said switch whereby the switch is operated upon actuation of the mixture controlling means, a suction operated piston forming part of said operating connections and movable by engine suction when the engine becomes self-operative to a position where the operating connection between the mixture controlling means and the switch is disabled, whereby closing of the control switch during engine operation is prevented.

39. In a starting apparatus for internal combustion engines, a starting motor, a current source, a circuit between the motor and current source, a switch for controlling said circuit, means for closing said switch to cause the starting motor to become operative, a device for regulating the supply of fuel mixture to the engine, means operable during operation of the engine under certain operating conditions to prevent closing of said switch by its closing means, and means operable by the mixture regulating device for rendering the switch closing means ineffective under another operating condition when the first named means for preventing closing of the switch is ineffective.

40. In a starting apparatus for internal combustion engines, a starting motor, a current source, a circuit between the motor and current source, a switch for controlling said circuit, means for closing said switch to cause the starting motor to become operative, a device for regulating the supply of fuel mixture to the engine, means operable in response to a predetermined engine suction to prevent closing of said switch while such predetermined suction is maintained and means operable by the mixture regulating device, when moved to a position to supply a large quantity of fuel mixture to the engine, for rendering the switch closing means ineffective under another operating condition when the first named means for preventing closing of the switch is ineffective.

41. In a starting apparatus for an internal combustion engine having an induction passage for conveying combustible mixture to the engine, the combination of a starting motor, a current source, a circuit between said motor and current source, a control switch for controlling said circuit, an operating mechanism for said switch including a control member determining the effectiveness of said operating mechanism and engageable by a part of said operating mechanism when the latter is actuated to close the switch, said member being movable in response to engine operation, to a position where it renders the operating mechanism ineffective to close the switch and said operating mechanism further including a means effective upon actuation of the switch operating means to close the switch for preventing movement of said member by engine suction to its ineffective position as long as the force exerted by said switch operating means on said suction operated member is greater than the force exerted by engine suction on said member.

42. In a starting apparatus for an internal combustion engine having an induction passage for conveying combustible mixture to the engine, the combination of a starting motor, a current source, a circuit between said motor and current source, a control switch for controlling said circuit, means for controlling the quantity of combustible mixture supplied to the engine, means operable by the mixture controlling means for operating said switch, a control member for controlling the effectiveness of said operating means and engageable by a part of the switch operating means when said means is actuated to close the switch and movable in response to engine suction to a position where it renders the switch operating means ineffective to operate the switch, and means effective upon actuation of the switch operating means for preventing movement of said member by engine suction to its ineffective position as long as the force exerted by said switch operating means on said suction operated member is greater than the force exerted by engine suction on said member.

43. In a starting apparatus for an internal combustion engine having an induction passage for conveying combustible mixture to the engine, the combination of a starting motor, a current source, a circuit between said motor and current source, a control switch for controlling said circuit, manually operable mechanism for operating said switch, a suction operated element forming a part of said mechanism for transmitting the force exerted by the operator to the switch to hold said switch closed, said element being movable by engine suction to a position where it does not form a part of such operating mechanism and renders said mechanism ineffective, and means whereby the movement of said element by suction is prevented when the manually operated mechanism is actuated to close the switch so long as the force exerted by said operating mechanism on said element is greater than the force exerted by the suction on said element.

44. In a starting apparatus for an internal combustion engine having an induction passage for conveying combustible mixture to the engine, the combination of a starting motor, a current source, a circuit between said motor and current source, a control switch for controlling said circuit, an operating means for said switch, a control mechanism for controlling the effectiveness of said operating means including a member movable in response to engine suction to render said operating means ineffective, said member being held in effective position by the switch operating means when the switch is held closed and being movable by the engine suction only after the pressure exerted by the operator on the switch operating means to hold the switch closed is at least partially reduced.

45. In a starting apparatus for internal combustion engines, a current source, a starting motor operable by current from said source, a control circuit for said motor having a control switch therein, an operating lever for positively closing the switch and an operating rod connected thereto, an accelerator pedal for controlling the supply of fuel mixture to the engine and a switch operating member positively connected to the accelerator pedal for operation thereby, means effective when the engine is inoperative to operatively connect said operating rod and said switch operating member to establish a train of operating mechanism between the accelerator pedal and the switch so that operation of the accelerator pedal will close the switch, and means operative by engine suction when the engine is in operation to move the connecting means to a position to disconnect said switch operating member from the operating rod, in order to permit operation of the accelerator pedal without closing the switch.

46. The combination of an automotive propelling engine, a suction intake, a throttle device therefor in control of the fuel supply, an electric starting motor and a control switch therefor, means for controlling the quantity of combustible mixture supplied to the engine and means operated thereby for closing the control switch, a member responsive to the engine suction and adapted to occupy different positions when the engine is active or inactive, and means whereby the position of said member when the engine is running, controls the effectiveness of the switch closing means.

47. Starting apparatus for an internal combustion engine comprising, in combination, an engine control member, a starting motor and a current source for supplying current to the starting motor, a normally open control circuit for controlling the operation of the starting motor, a switch for closing the control circuit, an element responsive to engine suction and cooperating with said engine control member to effect closing of said switch and movable to two predetermined positions, said engine control member being operable to close said control switch only when said element is in one of its predetermined positions and said element being movable by engine suction to the other of its predetermined positions only when the engine control member is withdrawn from the position it occupies when the switch is closed.

48. In combination with an internal combustion engine having a carburetor provided with a throttle and manual means for operating said throttle; a starting mechanism comprising a current source, a starting motor operable by current from said current source, a control switch controlling the operation of said starting motor and operable by said manual means, a suction operated member forming part of a force transmitting connection between said manual means and the control switch, said suction operated member being movable by engine suction to a position in which it does not form a part of such force transmitting connection.

49. In a starting apparatus for internal combustion engines, having a starting motor, a current source, a circuit between the motor and current source, a switch for controlling said circuit, means for closing said switch to cause the starting motor to become operative, a device for regulating the supply of fuel mixture to the engine, means operable during operation of the engine when the manifold vacuum exceeds a predetermined vacuum to prevent the closing of said switch by said operating means and another means operable to prevent the closing of said switch by the switch operating means when the manifold vacuum is below said predetermined vacuum.

50. In a starting apparatus for internal combustion engines having a starting motor, a current source, a circuit between the motor and current source, a switch for controlling said circuit, means for closing said switch to cause the starting motor to become operative, a device for regulating the supply of fuel mixture to the engine, means operable during operation of the engine under certain operating conditions to prevent closing of the switch by its operating means, said means being ineffective under other operating conditions and another means for preventing the closing of said switch by the switch operating means under other engine operating conditions when the first mentioned means for preventing the closing of the switch is ineffective.

51. In combination with an internal combustion engine having a carburetor provided with a throttle and manual means for operating said throttle; a starting mechanism comprising a current source, a control switch controlling the operation of said starting motor and operable by said manual means, a suction operated member forming part of a force transmitting connection between said manual means and the control switch, said suction operated member being movable by engine suction to a position in which it does not form a part of such force transmitting connection, and means whereby said manual operating means also prevents the movement of said suction operated element to such position.

DOUGLAS COLLINS.

Certificate of Correction

Patent No. 2,399,542. April 30, 1946.

DOUGLAS COLLINS

It is hereby certified that error appears in the printed specification of the above numbered patent requiring correction as follows: Page 3, second column, line 14, for "valve" read *pin*; and that the said Letters Patent should be read with this correction therein that the same may conform to the record of the case in the Patent Office.

Signed and sealed this 31st day of December, A. D. 1946.

[SEAL]

LESLIE FRAZER.
*First Assistant Commissioner of Patents.*